US008682810B2

(12) United States Patent
Zhang (10) Patent No.: US 8,682,810 B2
(45) Date of Patent: Mar. 25, 2014

(54) METHOD AND SYSTEM FOR ANALYSIS OF FLOW CYTOMETRY DATA USING SUPPORT VECTOR MACHINES

(75) Inventor: Hong Zhang, Savannah, GA (US)

(73) Assignee: Health Discovery Corporation, Atlanta, GA (US)

( * ) Notice: Subject to any disclaimer, the term of this patent is extended or adjusted under 35 U.S.C. 154(b) by 747 days.

(21) Appl. No.: 12/367,541

(22) Filed: Feb. 8, 2009

(65) Prior Publication Data

US 2009/0204557 A1 Aug. 13, 2009

Related U.S. Application Data

(60) Provisional application No. 61/027,416, filed on Feb. 8, 2008.

(51) Int. Cl.
*G06F 15/18* (2006.01)

(52) U.S. Cl.
USPC ............. 706/12; 382/100; 382/128; 382/134; 702/19

(58) Field of Classification Search
CPC .............................. G06N 99/005; G06T 7/0012
USPC ................ 706/12; 382/100, 128, 134; 702/19
See application file for complete search history.

(56) References Cited

U.S. PATENT DOCUMENTS

| 5,872,627 A | 2/1999 | Miers | |
|---|---|---|---|
| 6,128,608 A * | 10/2000 | Barnhill | 706/16 |
| 6,714,925 B1 * | 3/2004 | Barnhill et al. | 706/48 |
| 6,882,990 B1 | 4/2005 | Barnhill et al. | |
| 6,996,549 B2 * | 2/2006 | Zhang et al. | 706/16 |
| 7,522,758 B2 | 4/2009 | Ortyn et al. | |
| 2006/0074821 A1 * | 4/2006 | Cristianini | 706/12 |
| 2006/0224539 A1 * | 10/2006 | Zhang et al. | 706/20 |

OTHER PUBLICATIONS

"A Kernel Between Sets of Vectors", Risi Kondor, Tony Jebara, Proceedings of the Twentieth International Conference on Machine Learning (ICML-2003), Washington, DC 2003, 8 pages.*

"Genomic approaches to hematologic malignancies", Benjamin L. Ebert, Todd R. Golub, Blood Journal, American Society of Hematology, May 20, 2004, pp. 923-932.*

Adjouadi, Malek et al., Multidimensional Pattern Recognition and Classification of White Blood Cells Using Support Vector Machines, Part. Part. Syst. Charact. 22 (2005) 107-118.

Edwards, Bruce S. et al., High-throughput flow cytometry for drug discovery, Expert. Opin. Drug Discov. (2007) 2 (5):1-12.

(Continued)

*Primary Examiner* — Kakali Chaki
*Assistant Examiner* — Mai T Tran
(74) *Attorney, Agent, or Firm* — Eleanor M. Musick; Procopio, Cory, Hargreaves & Savitch LLP (57) ABSTRACT

An automated method and system are provided for receiving an input of flow cytometry data and analyzing the data using one or more support vector machines to generate an output in which the flow cytometry data is classified into two or more categories. The one or more support vector machines utilize a kernel that captures distributional data within the input data. Such a distributional kernel is constructed by using a distance function (divergence) between two distributions. In the preferred embodiment, a kernel based upon the Bhattacharyya affinity is used. The distributional kernel is applied to classification of flow cytometry data obtained from patients suspected having myelodysplastic syndrome.

24 Claims, 4 Drawing Sheets

(56) References Cited

OTHER PUBLICATIONS

Fiser, Karel et al., MRD Monitoring of Childhood ALL Using Hierarchical Clustering and Support Vector Machine Learning of Complex Multi-Parameter Flow Cytometry Data, Presentation given at American Society of Hematology 50th annual meeting and exposition, Dec. 6, 2008 5:30 p.m-7:30 p.m. Hall A (Moscone Center, San Francisco, CA), Poster Board I-613.

Hayes, Daniel F. MD, Fine-Needle Aspiration and Flow Cytometry for Evaluation of Primary Breast Cancer, Radiology, Nov. 1992, 337-338.

Herzenberg, Leonore A. et al., Interpreting flow cytometry data: a guide for the perplexed, Nature Immunology, vol. 7, No. 7, Jul. 2006, 681-685.

Jebara, Tony et al., Bhattacharyya and Expected Likelihood Kernels, Conference on Learning Theory, COLT 2003, 15 pages.

Lindblad, Joakim, Development of Algorithms for Digital Image Cytometry, Comprehensive Summaries of Uppsala Dissertations from the Faculty of Science and Technology, ACTA Universitatis Upsaliensis Uppsala 2002, 1-67.

Mattfeldt, T. et al., Prediction of the axillary lymph node status in mammary cancer on the basis of clinicopathological data and flow cytometry, Med. Biol. Eng. Comput., 2004, 42, 733-739.

Pozdnoukhov, Alexei et al., Improving Kernel Classifiers for Object Categorization Problems, Proceedings of the 22nd International Conference on Machine Learning, Bonn, Germany, 2005, 5 pages.

Rajwa, Bartek et al., Automated Classification of Bacterial Particles in Flow by Multiangle Scatter Measurement and Support Vector Machine Classifier, Cytometry Part A, 73A: 369-379, 2008.

Scott, Bart L. et al., Validation of a flow cytometric scoring system as a prognostic indicator for posttransplantation outcome in patients with myelodysplastic syndrome, Blood, 2008 112: 2681-2686, republished online Jul. 7, 2008: doi: 10.1182/blood-2008-05-153700.

Spidlen, Josef et al., Data Standards for Flow Cytometry, OMICS A Journal of Integrative Biology, vol. 10, No. 2, 2006, 209-214.

Toedling, Joern et al., Automated in-silico detection of cell populations in flow cytometry readouts and its application to leukemia disease monitoring, BMC Bioinformatics 2006 (accepted Jun. 5, 2006), 7:282, 11 pages.

Wells, Denise A. et al, Myeloid and monocytic dyspoiesis as determined by flow cytometric scoring in myelodysplastic syndrome correlates with the IPSS and with outcome after hematopoietic stem cell transplantation, Blood, Jul. 1, 2003, vol. 102, No. 1, 394-403.

West, R.R. et al., Cytogenetic abnormalities in the myelodysplastic syndromes and occupational or environmental exposure. Blood, 2000, 95: 2093-2097.

Loken, Michael, et al., "Flow cytometry in myelodysplastic syndromes: Report from a working conference", Leukemia Research 32 (2008) 5-17.

Written Opinion of the International Searching Authority and International Search Report, PCT/US2009/033504, Aug. 2, 2009.

* cited by examiner

METHOD AND SYSTEM FOR ANALYSIS OF FLOW CYTOMETRY DATA USING SUPPORT VECTOR MACHINES

RELATED APPLICATIONS

This application claims the priority of U.S. Provisional Application No. 61/027,416 filed Feb. 8, 2008, which is incorporated herein by reference in its entirety.

FIELD OF THE INVENTION

The present invention relates to a method for automated analysis of distributional data, particularly flow cytometry data, using support vector machines.

BACKGROUND OF THE INVENTION

Flow cytometry is the measurement of characteristics of minute particles suspended in a flowing liquid stream. A focused beam of laser light illuminates each moving particle and light is scattered in all directions. Detectors placed forward of the intersection point or orthogonal to the laser beam receive the pulses of scattered light, generating signals which are input into a computer analyzer for interpretation. The total amount of forward scattered light detected depends on particle size and refractive index but is closely correlated with cross-sectional area of the particle as seen by the laser, whereas the amount of side scattered light can indicate shape or granularity.

One of the most widely used applications of flow cytometry is that of cellular analysis for medical diagnostics, where the particles of interest are cells suspended in a saline-containing solution. Further properties of the cell, such as surface molecules or intracellular constituents, can also be accurately quantitated if the cellular marker of interest can be labeled with a fluorescent dye; for example, an antibody-fluorescent dye conjugate may be used to attach to specific surface or intracellular receptors. Immunophenotyping by characterizing cells at different stages of development through the use of fluorescent-labeled monoclonal antibodies against surface markers is one of the most common applications of flow cytometry. Other dyes have been developed which bind to particular structures (e.g., DNA, mitochondria) or are sensitive to the local chemistry (e.g., Ca++ concentration, pH, etc.).

While flow cytometry is widely used in medical diagnostics, it is also useful in non-medical applications, such as water or other liquid analysis. For example, seawater may be analyzed to identify presence of or types of bacteria or other organisms, milk can be analyzed to test for microbes, and fuels may be tested for particulate contaminants or additives.

The laser beam that is used is of a suitable color to excite the fluorochrome or fluorochromes selected. The quantity of fluorescent light emitted can be correlated with the expression of the cellular marker in question. Each flow cytometer is usually able to detect many different fluorochromes simultaneously, depending on its configuration. In some instruments, multiple fluorochromes may be analyzed simultaneously by using multiple lasers emitting at different wavelengths. For example, the FACSCalibur™ flow cytometry system available from Becton Dickinson (Franklin Lakes, N.J.) is a multi-color flow cytometer that is configured for four-color operation. The fluorescence emission from each cell is collected by a series of photomultiplier tubes, and the subsequent electrical events are collected and analyzed on a computer that assigns a fluorescence intensity value to each signal in Flow Cytometry Standard (FCS) data files. Analysis of the data involves identifying intersections or unions of polygonal regions in hyperspace that are used to filter or "gate" data and define a subset of sub-population of events for further analysis or sorting.

The International Society for Analytical Cytology (ISAC) has adopted the FCS Data File Standard for the common representation of FCM data. This standard is supported by all of the major analytical instruments to record the measurements from a sample run through a cytometer, allowing researchers and clinicians to choose among a number of commercially-available instruments and software without encountering major data compatibility issues. However, this standard stops short of describing a protocol for computational post-processing and data analysis.

Because of the large amount of data present in a flow cytometry analysis, it is often difficult to fully utilize the data through a manual process. The high dimensionality of data also makes it infeasible to use traditional statistical methods and learning techniques such as artificial neural networks. The support vector machine is a kernel based machine learning technique capable of processing high dimensional data. It can be an effective tool in handling the flow data with an appropriately designed kernel.

Kernels play a critical role in modern machine learning technologies such as support vector machines (SVM). A support vector machine for classification is defined as an optimal hyperplane in a feature space, which is often a high dimensional (even infinite dimensional) inner product space. The construction of the optimal hyperplane requires the inner products, in the feature space, of mapped input vectors. A kernel function defined on the input space provides an effective way to compute the inner products without actually mapping the input to the feature space. The kernel defines a similarity measure between two vectors. An advantage of the SVM approach is its ability to harvest hidden patterns based solely on the natural similarity measure of the kernel, without using explicit feature extractions.

In many applications such as image recognition and flow cytometry data analysis, the input data are usually of high dimensions and in large quantities. The important features of such data are usually in the distributions of the points in certain spaces, rather than the isolated values of individual points. The standard kernels (e.g., polynomial kernels and Gaussian kernels) are often ineffective on this type of data because the standard kernels treat all vector components equally, so that the large input volumes tend to make the kernels insensitive to the underlying structures and the distributional features of the specific problems. As a result, they are not well suited for distributional data. For example, SVM analysis of flow cytometry data has been reported using radial basis function (RBF) kernels, examples of which are Gaussian and B-spline kernels. (See, Rajwa, B., et al., "Automated Classification of Bacterial Particles in Flow by Multiangle Scatter Measurement and Support Vector Machine Classifier", *Cytometry Part A,* 73A:369-379 (2008).) The described method required the use of an "enhanced scatter-detection system" to obtain the reported high classification accuracy. Further, the authors concluded that the SVM results could not easily be interpreted if the dimensionality of the problem was higher than 2. Such a limitation minimizes the practical applications of such a technique. Toedling, et al. in "Automated in-silico detection of cell populations in flow cytometry readouts and its application to leukemia disease monitoring", *BMC Bioinformatics,* 7:282, June 2006, describe SVM analysis of flow cytometry data using a radial basis function kernel to detect leukemic cells by assigning single cells to predefined groups. In effect, the SVM analysis takes the place of manual gating but does not take into account any distributional features of the data.

Accordingly, the need remains for a method for analysis of flow cytometry data and other types of distributional data that includes important information within the underlying structures and distribution and is capable of use with higher dimensionalities. The present invention is directed to such a method.

BRIEF SUMMARY OF THE INVENTION

According to the present invention, flow cytometry data is analyzed using SVM kernels that are specifically created for data that is of a distributional nature. The input data p setting is a collection of a large number of points in a space. For example, an image can be regarded as a set of points in a 2-dimensional space. After proper normalizations, p may be viewed as a probability distribution. To define a kernel on two such input data p and q to capture the distributional trends, a function on p and q is defined to measures the similarity between the two entire distributions rather than just the individual points in the distributions.

Support vector machines, examples of which are generally disclosed in U.S. Pat. No. 6,760,715, U.S. Pat. No. 7,117,188 and U.S. Pat. No. 6,996,549, among others, which are incorporated herein by reference, are utilized to analyze flow cytometry data generated by a conventional commercial flow cytometry set-up. Exemplary systems for practicing flow cytometry measurement are described in U.S. Pat. No. 5,872,627, and No. 4,284,412, which are incorporated herein by reference. In the specific examples described herein, the data relates to a medical diagnostic application, specifically for detecting hematological conditions such as myelodysplastic syndrome (MDS). Flow cytometric immunophenotyping has proven to be an accurate and highly sensitive method for detection of quantitative and qualitative abnormalities in hematopoietic cells even when combined morphology and cytogenetics were nondiagnostic.

According to the present invention, an automated method and system are provided for receiving an input of flow cytometry data and analyzing the data using one or more support vector machines to generate an output in which the flow cytometry data is classified into two or more categories. The one or more support vector machines utilize a kernel that captures distributional data within the input data. Such a distributional kernel is constructed by using a distance function (divergence) between two distributions. Examples of suitable distance functions that measure the discrepancy between two probability distributions include Kullback-Leibler divergence, Bhattacharyya affinity, Jeffrey's divergence, Mahalanobis distance, Kolmogorov variational distance, and expected conditional entropy. In the preferred embodiment, the Bhattacharyya affinity is used. The distributional kernel is applied directly in a SVM or other learning machine to create classifiers and other predictive systems.

DETAILED DESCRIPTION OF AN EXEMPLARY EMBODIMENT

According to the present invention, a method and system are provided for analysis of flow cytometry data. In particular, the inventive method includes creation of kernels for use in the analysis of data of distributional nature. An input data p in a flow cytometry application is a collection of a large number of points in a space. For example, an image can be regarded as a set of points in a 2-dimensional space. After proper normalizations, p may be viewed as a probability distribution. To define a kernel on two such input data p and q to capture the distributional trends, one must define a function on p and q that measures the similarity between the two entire distributions rather than just the individual points in the distributions.

One way to construct such a "distributional kernel" is to use a distance function (divergence) between the two distributions. If $\rho(p,q)$ is a distance function, then the following is a kernel $$k(p,q)=e^{-\rho(p,q)}.$$

There are many distance functions that measure the discrepancy between two probability distributions. Kullback-Leibler divergence, Bhattacharyya affinity, Jeffrey's divergence, Mahalanobis distance, Kolmogorov variational distance, and expected conditional entropy are all examples of such distances. Given a distance function, a kernel can be constructed based on the above formula.

For example, a special custom kernel can be constructed based on Bhattacharyya affinity. For normal distributions with mean M and covariance matrix $\Sigma$, Bhattacharyya affinity has the form:

$$\rho(p, q) = \frac{1}{8}(M_2 - M_1)^T \left[\frac{\Sigma_1 + \Sigma_2}{2}\right]^{-1} (M_2 - M_1) + \frac{1}{2} \ln \frac{|(\Sigma_1 + \Sigma_2)/2|}{\sqrt{|\Sigma_1| \cdot |\Sigma_2|}}$$

From this distance function, a new kernel is defined using the above equation.

$$k(p, q) = e^{-\rho(p,q)} =$$

$$\left(\sqrt{\frac{|(\Sigma_1 + \Sigma_2)/2|}{\sqrt{|\Sigma_1| \cdot |\Sigma_2|}}}\right)^{-1} \exp\left\{-\frac{1}{8}(M_2 - M_1)^T \left[\frac{\Sigma_1 + \Sigma_2}{2}\right]^{-1} (M_2 - M_1)\right\}$$

This distributional kernel is computationally efficient with a linear complexity and can handle large quantities of input data. A typical density estimation method has a computational complexity $O(n^2)$, which might be too high for some applications. The inventive distributional kernels can be applied directly in a SVM or other machine learning systems to create classifiers and other predictive systems. The distributional kernels provide some distinctive advantages over the standard kernels that are frequently used in SVMs and other kernel machines. They capture the similarities between the overall distributions of the large data components, which may be crucial in some applications.

Figure 3:
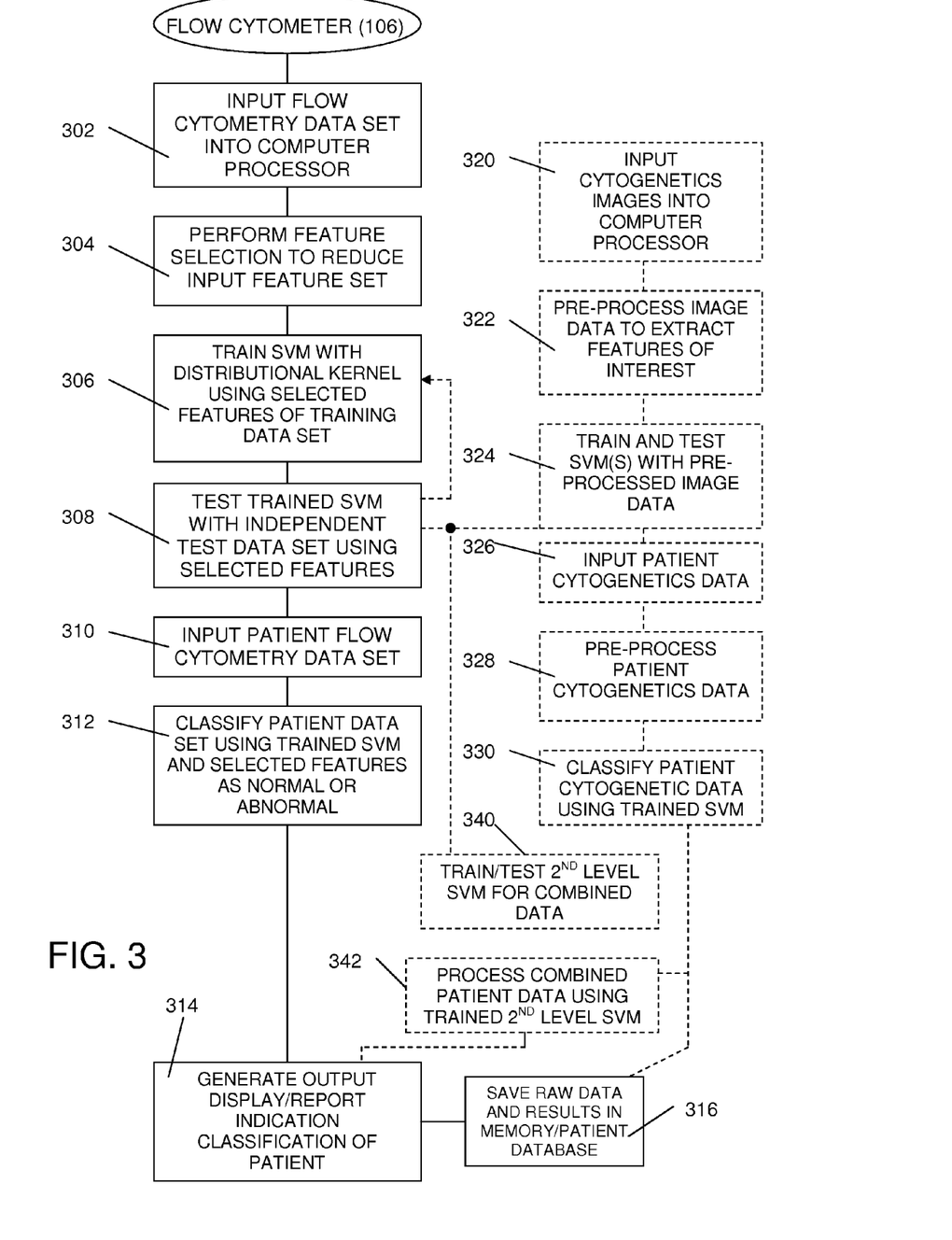
FIG. 3 is a flow chart of the data analysis method according to the present invention.

FIG. 3 provides an exemplary process flow used for analysis of flow cytometry data. As will be readily apparent to those in the art, flow cytometry data is provided as an example of distributional data, and other types of distributional data may be processed and classified using the techniques described in the following.

The raw data generated by the flow cytometer 106 is input into a computer processing system (step 302) which includes at least a memory and a processor that is programmed to execute one or more support vector machines. A typical personal computer (PC) or APPLE® MACINTOSH®-type processor is suitable for such processing. The input data set may be divided into two portions, one for use in training the support vector machine, the other for use in testing the effectiveness of the training. In step 304, feature selection algorithms are run on the training data set by executing one or more feature selection programs within the processor. In step 306, the training data set with the reduced feature set is processed using a support vector machine with a distributional kernel such as the Bhattacharyya affinity-based kernel. The effectiveness of the training step is evaluated in step 308 by extracting the data corresponding to the features selected in step 304 in the independent test data set and processing the test data using the trained SVM with the distributional kernel. If the results of the test indicate a less than optimal result, the SVM will be re-trained and retested until an optimal solution is attained. If the training is determined to be satisfactory, live data corresponding to flow cytometry measurements taken on a patient sample is input into the processor in step 310. The features that were selected in step 304 are selected from the patient data and processed through the trained and tested SVM with distributional kernel in step 312, with the result being a classification of the patient sample as normal or abnormal. In step 314, a report summarizing the results is generated which may be displayed on a computer monitor 122, on a printed report 124, and/or transmitted via e-mail or other network file transfer system to a research or clinical laboratory, hospital or physician's office. Histograms with one-and two-dimensional representations of the data groupings may also be displayed and/or printed. The results will also be stored, along with the raw data, histograms and other patient data within the computer memory or a patient database.

An optional additional diagnostic procedure may be combined with the flow cytometry data and results to provide enhanced confidence in an automated analysis system. Using a scheme similar to that disclosed in U.S. Pat. No. 7,383,237, of Zhang et al., which is incorporated herein by reference, the results of the flow cytometry testing may be combined with other types of testing. FIG. 3 illustrates an optional flow path for performing computer-aided image analysis of cytogenetic data using SVMs by extracting features of interest from images of chromosomes generated in conventional procedures such as karyotyping or fluorescent in-situ hybridization (FISH), to identify deletions, translocations, inversions and other abnormalities. In step 320, training image data is input into the computer processor where it is pre-processed to identify and extract features of interest. In general, the training image data is pre-processed to identify features of interest (step 322), then used to train the image-processing SVM. Test image data are then used to verify that an optimal solution has been attained (step 324). If not, step 324 will be repeated and the SVM will be re-trained and re-tested. If the optimal solution has been achieved, live patient image data will be input (step 326) for pre-processing (step 328) and classification (step 330).

In a preferred approach, as described in U.S. Pat. No. 7,383,237, each feature of interest within the image is separately pre-processed (step 322) and processed by an SVM which is optimized for that feature. The results of the analyses of all features of interest are combined in a $2^{nd}$ level image-processing SVM to generate an output classifying the entire image. The trained SVM(s) is/are tested using pre-processed image test data (step 324). If the solution is optimal, images corresponding to live patient data (the same patient for whom the flow cytometry analysis is performed) are input into the processor (step 326). The patient image data is pre-processed (step 328) to identify the features of interest and each feature of interest is processed through the trained first level SVMs that are optimized for the specific feature. The combined results of the analyses of the features of interest are combined and input into the trained $2^{nd}$ level image-processing SVM to generate an output classifying the entire image (step 330).

The results of step 330 can be communicated for storage in the patient's file in the patient database (step 316) and/or will be input into a $2^{nd}$ level SVM for analysis in combination with the flow cytometry data results from step 312. This $2^{nd}$ level SVM will have already been trained and tested using the training and test data as indicated by the dotted lines between steps 308, 324 and 340. The results of step 316 and step 330 are combined for processing by trained $2^{nd}$ level SVM for combined analysis in step 342. The results of this combined processing with generally be a binary output, e.g., normal or abnormal, diseased or no disease, etc. The combined results may be output for display in step 314 and/or input into a memory or patient database for storage (step 316). Additional optional secondary flow paths may be provided to incorporate other types of data and analysis, such as expert analysis, patient history, etc., which may be combined to produce an ultimate diagnostic or prognostic score or other output that may be used for screening, monitoring and/or treatment.

Example 1

Detection of Myelodysplastic Syndrome (MDS)

Figure 1:
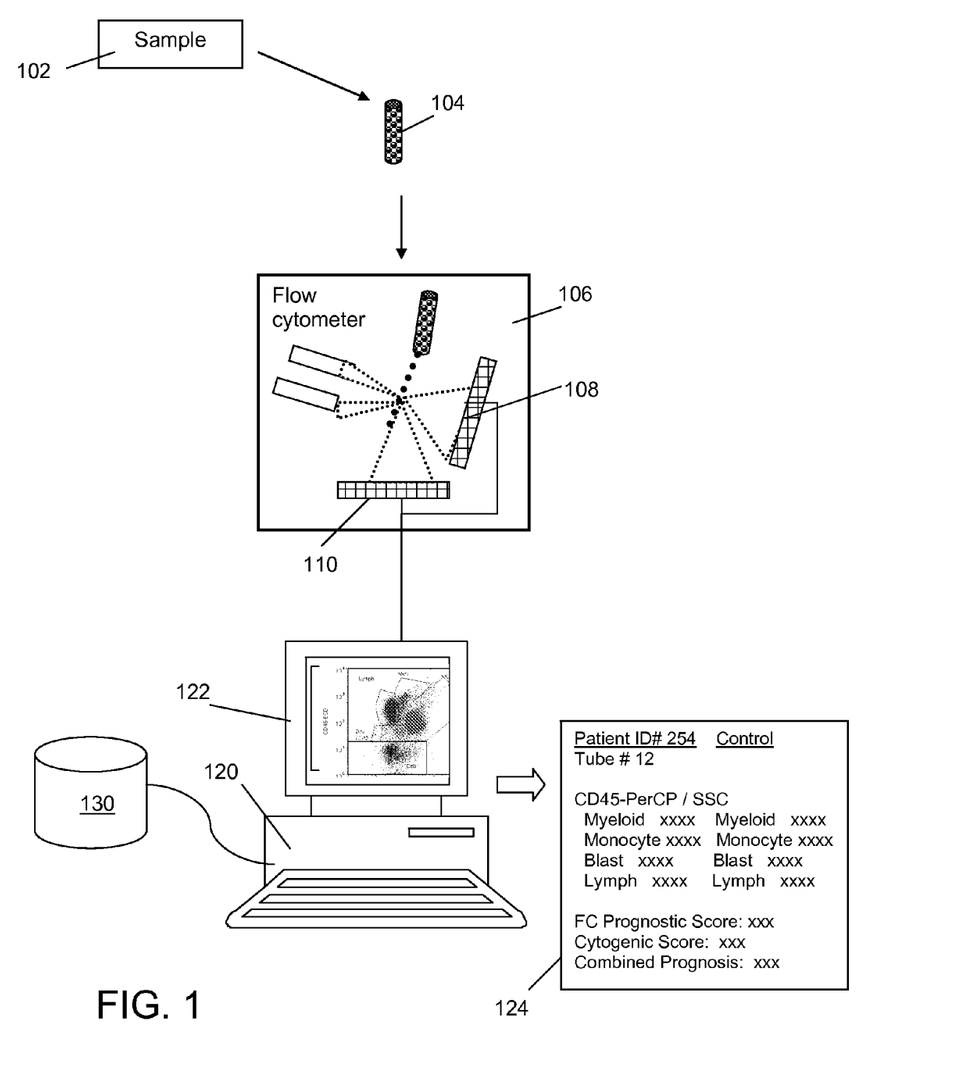
FIG. 1 is a diagrammatic view of a system for automated collection and analysis of flow cytometry data according to the present invention.

The object of the present study is to investigate the potential connections between Myelodysplastic Syndrome (MDS)—related chromosome abnormalities in cytogenetics and the patterns in flow cytometry data. This immunophenotyping analysis is one of the most common applications of flow cytometry and the protocols for sample collection and preparation are well known to those in the art. Following the sequence illustrated in FIG. 1, bone marrow aspirates 102 from patients suspected of having MDS are collected in a saline or sodium heparin solution to create a cell suspension in a number of tubes 104 or other containers that are adapted to introduce the suspension into the flow cell of flow cytometer system 106. Reagents containing monoclonal antibodies conjugated with different fluorochromes are introduced into the tubes, with each tube receiving different combinations of antibodies with each different combination conjugated with one of several possible fluorochromes. Flow cytometers are commercially available from numerous manufacturers including the FACSCalibur™ from Becton Dickinson (Franklin Lakes, N.J.) or the Cytoron/Absolute™ from Ortho Diagnostics (Raritan, N.J.). For the instant example, a FACSCalibur™ system was used for four-color measurement. As will be apparent to those in the art, such systems provide automated handling of multiple samples loaded into a carousel, so that the illustrations are intended to be diagrammatic, indicating only the presence of a sample within the flow cytometer's analyzer field. The forward scatter detector 108 and side scatter detectors 110 in the flow cytometer system 106 generate electrical signals corresponding to detected events as the cells are directed through the analysis stream. Fluorescence detectors, included among the side scatter detectors 110, measure the amplitudes of the fluorescent signals generated by expression of the antigens as indicated by the antibodies conjugated with the different fluorescent markers. Numerical values are generated based on pulse heights (amplitudes) measured by each of the various detectors. The resulting signals are input into a processor within computer workstation 120 and used to create histograms (single or dual parameter) corresponding to the detected events for display on a graphical display monitor 122. Analysis of this data according to the present invention, which involves classification of the input data according to normal or abnormal based on comparison to control samples, results in a report 124 which may be printed or displayed on the monitor 122. The raw data, histograms and report will also be saved in either or both of an internal memory in computer workstation 120 and a separate memory device, which may include a database server 130 which may be part of a data warehouse in a medical laboratory or other medical facility, for association with other records for the patient.

The input dataset includes 77 cases (patients) that have both flow cytometry and cytogenetics data. All patients are suspected of having MDS. Among the 77 cases, 37 had chromosome abnormalities as indicated by cytogenetic testing, which involves microscopic examination of whole chromosomes for changes in number or structure. The remaining 40 were found to be negative under cytogenetics.

Figure 2:
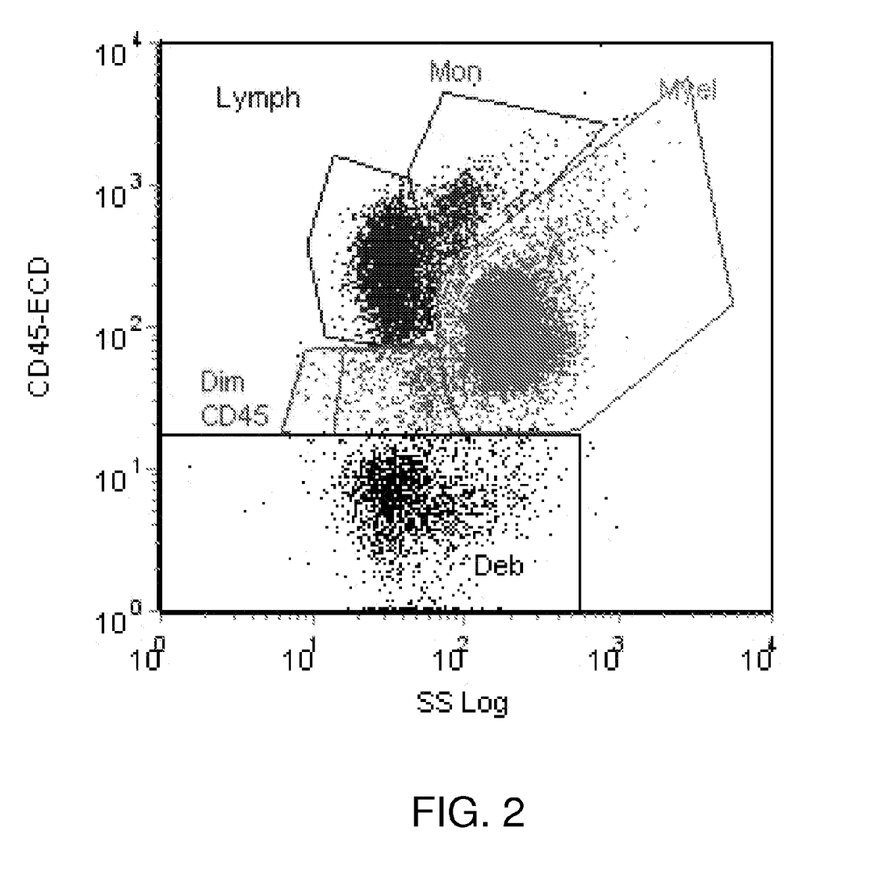
FIG. 2 is an exemplary log-log display of distributions of populations of interest in flow cytometry analysis for MDS.

The aspirated bone marrow samples in suspension were divided among 13 tubes for each patient. In a standard 4-color immunofluorescence protocol, forward light scatter (FSC) and right angle light scatter (SSC) were collected along with 4-color antibody combinations to perform seven different assays, one of which was blank. Each case typically had 20,000-50,000 events where all of the assays are measured. The resulting flow cytometry dataset for each case had approximately $10^6$ measurements. FIG. 2 illustrates an exemplary histogram showing side scatter versus CD45 expression with the different cell populations marked.

For each of the 13 tubes, FSC and SSC were measured, allowing gating to exclude cellular debris, shown in the lower left corner of FIG. 2. In addition, different combinations of antigen specificities with fluorescence markers were used for each tube. Table 1 below lists the different combinations of monoclonal antibodies with the following markers: FITC (fluoroscein isothiocyanate), PE (phycoerythrin), PerCP (peridinin-chlorophyl), and APC (allophycocyanin). Monoclonal antibodies conjugated with the identified fluorescent markers are commercially available from a number of different sources including Becton-Dickinson Immunocytometry Systems (San Jose, Calif.), DakoCytomation (Carpinteria, Calif.), Caltag (Burlingame, Calif.) and Invitrogen Corporation (Camarillo, Calif.). The CD45 antibody, used for enumeration of mature lymphocytes, is included in each combination for validation of the lymphocyte gating.

TABLE 1

| Tube | FITC-conjugated | PE-conjugated | PerCP-conjugated | APC-conjugated |
|---|---|---|---|---|
| 1 | IgG1 | IgG1 + PI | CD45/2D1/IgG1 | IgG1 |
| 2 | IgG2b | IgG2b | CD45/2D1/IgG1 | IgG2b |
| 3 | CD8/SK1/IgG1 | CD2/RPA-2.10/IgG1 | CD45/2D1/IgG1 | CD4/SK3/IgG1 |
| 4 | CD7/M-T701/IgG1 | CD56/MY31/IgG1 | CD45/2D1/IgG1 | CD3/SK7/IgG1 |
| 5 | CD19/SJ25C1/IgG1 | CD23/M-L233/IgG1 | CD45/2D1/IgG1 | CD5/UCHT-2/IgG1 |
| 6 | CD22/S-HCL-1/IgG2b | CD10/HI10a/IgG1 | CD45/2D1/IgG1 | CD34/8G12/IgG1 |
| 7 | CD10/HI10a//IgG1 | CD11c/S-HCL-3/IgG2b | CD45/2D1/IgG1 | CD20/2H7/IgG2b |
| 8 | CD38/HB.7/IgG1 | Dako Kappa/F(ab)2rab | CD45/2D1/IgG1 | CD20/2H7/IgG2b |
| 9 | CD38/HB.7/IgG1 | Dako Lambda/F(ab)2rab | CD45/2D1/IgG1 | CD20/2H7/IgG2b |
| 10 | Kappa Caltag poly | Lambda Caltag poly | CD45/2D1/IgG1 | CD19/SJ25C1/IgG1 |
| 11 | HLA-DR/TU36/IgG2b | CD117/104D2 | CD45/2D1/IgG1 | CD11b/Mac-1/IgG1 |
| 12 | CD14/MoP9/IgG2b | CD13/L138/IgG1 | CD45/2D1/IgG1 | CD64/10.1/IgG1 |
| 13 | CD16/NKP15/IgG1 | CD33/P67.6/IgG1 | CD45/2D1/IgG1 | CD34/8G12/IgG1 |

In order to provide data for both training the SVM and for evaluation of the training, the entire dataset for the 77 cases was divided into a training set and an independent test set. Forty cases (20 positive and 20 negative as determined by cytogenetic testing) were used to train the SVM. The remaining 37 cases (17 positive and 20 negative) were used to form an independent test set.

The previously-described custom kernel based on the Bhattacharyya affinity was used for analysis of the flow cytometry data to measure the discrepancy between two probability distributions.

Inclusion of data from all the assays in the classifier will not produce a system with the optimal performance. Therefore, a feature selection on the assays is conducted based on the training set. Two performance measures were applied in the feature selection step. The first feature selection method, the leave-one-out (LOO) error rate for SVM, involves training the SVM on the initial data set, then updating the scaling parameters by performing a gradient step so that LOO error decreases. These steps are repeated until a minimum of the LOO error is reached. A stopping criteria can be applied. The second feature selection method was the kernel alignment. Such a technique is described in U.S. Pat. No. 7,299,213 of Cristianini, which is incorporated herein by reference. Kernel alignment uses training data only and can be performed before training of the kernel machine takes place.

During the feature selection process, it was determined that a significant number of features would not contribute to the accurate classification of the data. The result of the feature selection procedure is given in the Table 2.

TABLE 2

| Assay | | | | Marker | | | |
|---|---|---|---|---|---|---|---|
| Tube # | Blank | FSC | SSC | FTIC | PE | PerCP | APC |
| 1 | 0 | 1 | 0 | 0 | 1 | 0 | 0 |
| 2 | 0 | 0 | 1 | 0 | 0 | 0 | 1 |
| 3 | 0 | 1 | 1 | 0 | 0 | 0 | 0 |
| 4 | 0 | 0 | 1 | 1 | 0 | 0 | 1 |
| 5 | 0 | 0 | 0 | 0 | 0 | 0 | 1 |
| 6 | 0 | 0 | 1 | 0 | 0 | 0 | 0 |
| 7 | 0 | 1 | 1 | 1 | 0 | 0 | 0 |
| 8 | 0 | 1 | 1 | 1 | 0 | 0 | 1 |
| 9 | 0 | 1 | 1 | 1 | 0 | 0 | 0 |
| 10 | 0 | 0 | 1 | 1 | 0 | 0 | 0 |
| 11 | 0 | 1 | 1 | 0 | 0 | 0 | 1 |

TABLE 2-continued

| Assay Tube # | Blank | FSC | SSC | Marker FTIC | PE | PerCP | APC |
|---|---|---|---|---|---|---|---|
| 12 | 0 | 0 | 0 | 0 | 0 | 0 | 0 |
| 13 | 0 | 0 | 0 | 0 | 0 | 0 | 0 |

A value of "1" in an entry of Table 2 means that a particular assay (tube/assay combination) is selected; "0" means that the assay was not selected. This reduced the number of features to be considered from each case for classifying the data to 26, down from the original 91. The data from the reduced number of assays was then used to train the SVM with the distributional kernel.

Using the selected assays, the trained SVM is then tested with the 37 independent cases. The results at the cutoff of 0 were summarized using the conventional statistical measure of the performance of a binary classification test. Sensitivity, or recall rate, provides a measure of the proportion of correctly classified positives to the total number of positives as determined by cytogenetic testing. Specificity measures the proportion of negatives which are correctly identified. The results of analysis of the test data were as follows:

Sensitivity: 15/17=88% Specificity: 19/20=95%

This produces an overall error rate of 3/37=8%. Using the estimated standard deviation for binomial distribution, $\sigma=0.0449$, the test produced a 95% confidence level that the error rate would be less than 15%.

Figure 4:
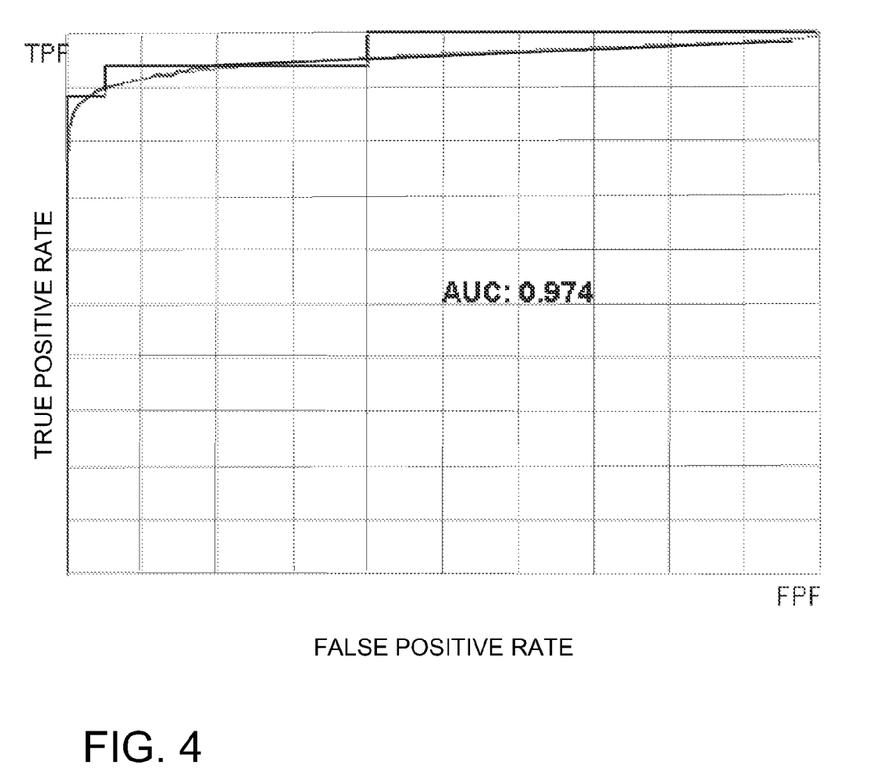
FIG. 4 is a plot showing the receiver operating characteristics (ROC) curve resulting from the application of the inventive method to analysis of flow cytometry data for MDS testing.

The trade-off between sensitivity and specificity is plotted in the receiver operating characteristic (ROC) curve that is shown in FIG. 4. The area under curve (AUC) for the present test was 0.974.

The results of the foregoing analysis exhibited a significant correlation between the flow cytometry patterns and certain chromosome abnormalities indicated by the cytogenetic test.

Because of the complexity of the flow cytometry data, it is difficult to explicitly extract necessary features or define patterns that will predict cytogenetic results. The SVM based system offers a distinctive advantage that it requires only a similarity measure between examples to construct the classifier.

The custom designed kernel of the present invention is shown to be promising in analyzing the flow cytometry data. This kernel has a computational complexity of O(n) which is very efficient for this problem. The results of the SVM analysis show that the kernel is also very effective.

The invention claimed is:

1. A method for analysis and classification of flow cytometry data, the method comprising:
    downloading an input dataset comprising a plurality of assays performed on a plurality of samples by flow cytometry analysis into a computer system comprising a processor and a storage device, wherein the processor is programmed to execute at least one support vector machine and performs the steps of:
    pre-processing a first portion of the input dataset with one or more feature selection algorithm to select a subset of assays from the plurality of assays;
    training a support vector machine comprising a distributional kernel to separate the first portion of the input dataset corresponding to the selected subset of assays into two probability distributions and measuring a discrepancy between the two probability distributions;
    testing the trained support vector machine with a second portion of the input dataset using the selected feature subset to determine whether an optimal solution is achieved;
    if an optimal solution is not achieved, repeating the steps of training and testing until the optimal solution is reached;
    once an optimal solution is reached, inputting a live data set of flow cytometry data into the computer system;
    processing the live data set using the selected subset of assays using the trained and tested support vector machine to produce a result comprising a classification of the flow cytometry data into one of two distinct classes; and
    generating an output display at a display device with an identification of a flow cytometry data classification.

2. The method of claim 1, wherein the distributional kernel comprises a Bhattacharyya affinity having the form:

$$k(p, q) = e^{-\rho(p,q)} = \left( \sqrt{\frac{|(\Sigma_1 + \Sigma_2)/2|}{\sqrt{|\Sigma_1| \cdot |\Sigma_2|}}} \right)^{-1} \exp\left\{ -\frac{1}{8}(M_2 - M_1)^T \left[\frac{\Sigma_1 + \Sigma_2}{2}\right]^{-1} (M_2 - M_1) \right\},$$

where p and q are input data points, M is the mean of a normal distribution and $\Sigma$ is a covariance matrix.

3. The method of claim 1, wherein the one or more feature selection algorithm comprises a leave-one-out error rate analysis.

4. The method of claim 1, wherein the one or more feature selection algorithm comprises kernel alignment.

5. The method of claim 1, wherein the one or more feature selection algorithm comprises two feature selection algorithms comprising leave-one-out error rate analysis and kernel alignment.

6. The method of claim 1, wherein the flow cytometry data comprises results of testing of aspirated bone marrow samples from patients being screened for myelodysplastic syndrome, and wherein the flow cytometry data classification comprises either presence or absence of the syndrome.

7. The method of claim 1, further comprising:
    downloading a digital image data set corresponding to one or more samples from which the flow cytometry data was obtained;
    separating the digital image data set into an image training set and an image testing set;
    pre-processing the image training set to identify and extract features of interest within the image training set;
    training at least one second support vector machine to classify the features of interest within the image training set;
    testing the at least one second support vector machine to determine whether an optimal solution has been achieved, and if not, repeating the steps of training and testing until the optimal solution has been achieved;
    inputting a live image data set corresponding to the live data set from which the flow cytometry data was obtained;
    processing the live image data to classify the features of interest within the live image data to produce an image classification;
    inputting the image classification and the flow cytometry data classification into a second level support vector machine for classification of a combination of data; and generating an output classification comprising a combined result of the image classification and the flow cytometry data classification.

8. The method of claim 7, wherein the input digital image data set and the live digital image data set are cytogenetic images from patients being screened for myelodysplastic syndrome.

9. The method of claim 8, wherein the output classification comprises either presence or absence of the syndrome.

10. The method of claim 1, wherein the subset of assays is selected from the plurality of samples, a plurality of light scatter angles, and a plurality of combinations of antibodies with markers.

11. A computer program product embodied on a non-transitory computer readable medium for analysis and classification of flow cytometry data, the computer program product comprising instructions for executing support vector machine classifiers and further for causing a computer processor to:
receive an input dataset comprising a plurality of assays performed on a plurality of samples by flow cytometry analysis;
pre-process a first portion of the input dataset with one or more feature selection algorithm to select a subset of assays of the plurality of assays;
train at least a first support vector machine comprising a distributional kernel to separate the first portion of the input dataset corresponding to the selected subset of assays into two probability distributions and measuring a discrepancy between the two probability distributions;
test the trained support vector machine with a second portion of the input dataset using the selected subset of assays to determine whether an optimal solution is achieved;
if an optimal solution is not achieved, repeat the steps of training and testing until the optimal solution is reached;
once an optimal solution is reached, receive a live data set of flow cytometry data into the computer system;
process the live data set using the selected subset of assays using the trained and tested support vector machine to produce a result comprising a classification of the live data set into one of two distinct classes; and
generate an output display at a display device with an identification of a classification of the live data set.

12. The computer program product of claim 11, wherein the distributional kernel comprises a Bhattacharyya affinity having the form:

$$k(p,q) = e^{-\rho(p,q)} = \left(\sqrt{\frac{|(\Sigma_1 + \Sigma_2)/2|}{\sqrt{|\Sigma_1| \cdot |\Sigma_2|}}}\right)^{-1} \exp\left\{-\frac{1}{8}(M_2 - M_1)^T \left[\frac{\Sigma_1 + \Sigma_2}{2}\right]^{-1} (M_2 - M_1)\right\},$$

where p and q are input data points, M is the mean of a normal distribution and $\Sigma$ is a covariance matrix.

13. The computer program product of claim 11, wherein the one or more feature selection algorithm comprises a leave-one-out error rate analysis.

14. The computer program product of claim 11, wherein the one or more feature selection algorithm comprises kernel alignment.

15. The computer program product of claim 11, wherein the one or more feature selection algorithm comprises two feature selection algorithms comprising leave-one-out error rate analysis and kernel alignment.

16. The computer program product of claim 11, wherein the flow cytometry data comprises results of testing of aspirated bone marrow samples from patients being screened for myelodysplastic syndrome, and wherein the result comprises an indication of presence or absence of the syndrome.

17. The computer program product of claim 11, further comprising instructions for causing the computer processor to:
receive a digital image data set corresponding to one or more samples from which the flow cytometry data was obtained;
separate the digital image data set into an image training set and an image testing set;
pre-process the image training set to identify and extract features of interest within the image training set;
train at least one second support vector machine to classify the features of interest within the image training set;
test the at least one second support vector machine to determine whether an optimal solution has been achieved, and if not, repeating the steps of training and testing until the optimal solution has been achieved;
receive a live image data set corresponding to the live data set from which the flow cytometry data was obtained;
process the live image data to classify the features of interest within the live image data to produce an image classification;
input the image classification and the flow cytometry data classification into a second level support vector machine for classification of a combination of data; and
generate an output classification comprising a combined result of the image classification and the flow cytometry data classification.

18. The computer program product of claim 17, wherein the input digital image data set and the live digital image data set are cytogenetic images from patients being screened for myelodysplastic syndrome.

19. The computer program product of claim 18, wherein the output classification comprises either presence or absence of the syndrome.

20. A method for analysis and classification of flow cytometry data, wherein the flow cytometry data comprises histograms generated from a plurality of different assays performed on a plurality of samples, the method comprising:
downloading an input data set comprising flow cytometry data from samples having known classifications into a computer system comprising a processor and at least one storage device, wherein the processor is programmed to execute at least one support vector machine and performs the steps of:
applying a feature selection algorithm to select a subset of assays of the plurality of different assays that produces a minimum error rate;
training and testing a support vector machine comprising a distributional kernel to separate the input data set corresponding to histograms from the selected subset of assays into two probability distributions and measuring a discrepancy between the two probability distributions until an optimal solution is obtained;
inputting live flow cytometry data for a sample having an unknown classification into the trained and tested support vector machine;
processing the live flow cytometry data corresponding to the selected subset of assays using the trained and tested support vector machine to produce an output comprising a classification result of the live flow cytometry data into one of two distinct classes; and storing the classification result in the at least one storage device.

21. The method of claim 20, wherein the distributional kernel comprises a Bhattacharyya affinity having the form:

$$k(p, q) = e^{-\rho(p,q)} = \left(\sqrt{\frac{|(\Sigma_1 + \Sigma_2)/2|}{\sqrt{|\Sigma_1| \cdot |\Sigma_2|}}}\right)^{-1} \exp\left\{-\frac{1}{8}(M_2 - M_1)^T \left[\frac{\Sigma_1 + \Sigma_2}{2}\right]^{-1} (M_2 - M_1)\right\},$$

where p and q are input data points, M is the mean of a normal distribution and $\Sigma$ is a covariance matrix.

22. The method of claim 20, wherein the one or more feature selection algorithm is selected from leave-one-out error rate analysis and kernel alignment.

23. The method of claim 20, further comprising:
downloading a cytogenetic image data set corresponding to one or more samples from which the input data set was obtained;
pre-processing the cytogenetic image data set to identify and extract features of interest;
training and testing at least one second support vector machine to classify the extracted features of interest within the cytogenetic image data set, wherein training and testing is repeated until an optimal solution has been achieved;
inputting a live cytogenetic image data set from the sample with unknown classification from which the live flow cytometry data was obtained;
processing the live image data to classify the features of interest within the live cytogenetic image data to produce an image classification;
inputting the image classification and the flow cytometry data classification into a second level support vector machine for classification of a combination of data; and
generating an output classification comprising a combined result of the image classification and the flow cytometry data classification.

24. The method of claim 20, wherein the selected subset of assays is selected from the plurality of samples, a plurality of light scatter angles, and a plurality of combinations of antibodies with markers.

* * * * *